United States Patent [19]

Ona et al.

[11] Patent Number: 5,110,865

[45] Date of Patent: May 5, 1992

[54] ORGANOPOLYSILOXANE EMULSION AND METHOD FOR THE PREPARATION THEREOF

[75] Inventors: Isao Ona; Masaru Ozaki, both of Chiba Prefecture, Japan

[73] Assignee: Toray Silicone Company, Ltd., Tokyo, Japan

[21] Appl. No.: 171,317

[22] Filed: Mar. 21, 1988

[30] Foreign Application Priority Data

Mar. 31, 1987 [JP] Japan .................................. 62-79194
Apr. 23, 1987 [JP] Japan ................................. 62-100274

[51] Int. Cl.$^5$ ............................................. C08L 83/06
[52] U.S. Cl. .................................................... 524/838
[58] Field of Search .......................................... 524/838

Primary Examiner—Paul R. Michl
Assistant Examiner—Peter Szekely
Attorney, Agent, or Firm—George A. Grindahl

[57] ABSTRACT

Organopolysiloxane emulsions are prepared by emulsifying components comprising an hydroxy-endblocked organopolysiloxane having an average of ten or more silicon atoms per molecule; an aminoxy group-containing organsilicon compound containing one or more silicon atoms per molecule; a surfactant and water. The process can be conducted advantageously at room temperature to provide emulsion of high-viscosity organopolysiloxanes. The emulsions are useful as, for example, fiber-treatment agents, lubricants, release agents, glass fiber-treatment agents, lustrants, defoamers, and paint components.

20 Claims, No Drawings

ORGANOPOLYSILOXANE EMULSION AND METHOD FOR THE PREPARATION THEREOF

BACKGROUND OF THE INVENTION

The present invention relates to organopolysiloxane emulsions and to a method for their preparation. In a particular aspect the present invention relates to nonionic organopolysiloxane emulsions which are useful as, for example, fiber-treatment agents, lubricants, release agents, glass fiber-treatment agents, lustrants, defoamers, and paint components.

Organopolysiloxane emulsions known in the art consist of the anionic and cationic organopolysiloxane emulsions obtained by the emulsion polymerization of organopolysiloxane in the presence of a strong acid or strong alkali {Japanese Patent Publication Number 34-2041 (2.041/59)}; the anionic and cationic organopolysiloxane emulsions prepared by the thermal emulsion polymerization of organopolysiloxane emulsified in water using benzenesulfonic acid or alkylbenzenesulfonic acid {Japanese Patent Publication Number 41-13995 (13,995/66)}; and the mechanically emulsified nonionic emulsions which are prepared by emulsifying relatively low-viscosity organopolysiloxane in the presence of a nonionic emulsifier using, for example, a colloid mill, line mill, or homomixer.

However, the aforesaid emulsion-polymerized emulsions suffer from a critical problem. Due to the use of anionic or cationic emulsifying agents and polymerization catalysts, the emulsion's stability is substantially impaired when an additive having the opposite ionicity is added during the course of the emulsion's utilization.

Another problem encountered in the aforesaid emulsion polymerization methods is that 5 to 15% oligomer is always produced due to the use of an equilibration reaction mediated by the polymerization catalyst. This oligomer is volatile, and when an emulsion obtained by such a method is used as one of various types of treatment agents, one finds that oligomer adheres on, for example, exhaust fans used in drying the treated material, with the resulting occurrence of an oily contaminant.

Furthermore, this oily debris can drop onto the treated substrate, causing stains.

In addition, the diorganopolysiloxanes prepared by prior emulsion polymerization methods have viscosities at most of 800,000 to 1,000,000 centistokes, and diorganopolysiloxanes having larger viscosities and diorganopolysiloxane gums cannot be prepared.

A further problem is the poor productivity resulting from the large energy consumption engendered by the requirement for heating during emulsion polymerization.

Furthermore in mechanical emulsification, the viscosity of the organopolysiloxane must be low enough to allow passage through the emulsifying device, and as a consequence it becomes quite difficult to obtain nonionic emulsions of high-viscosity organopolysiloxanes. The problem then arises that such mechanical emulsions cannot be used in applications such as fiber-treatment agents lubricants, release agents, glass fiber-treatment agents, lustrants, defoamers, and paint components where high-viscosity organopolysiloxanes are required.

BRIEF SUMMARY OF THE INVENTION

An object of the present invention is to overcome the above problems by providing a nonionic organopolysiloxane emulsion whose stability is not impaired even when an anionic or cationic additive has been added to the emulsion.

Another object of the present invention is to provide an emulsion-polymerized organopolysiloxane emulsion of organopolysiloxane having a viscosity higher than the viscosity of the organopolysiloxane prior to emulsification.

A further object of the present invention is to overcome the above problems by providing a method for the preparation of an organopolysiloxane emulsion, which method does not require heating, particularly during emulsion polymerization, which method substantially does not generate organopolysiloxane oligomer after emulsion polymerization, and which method is capable of producing emulsions of diorganopolysiloxane up to the level of gums, which has not previously been possible.

These objects, and others that will occur to one upon considering the following disclosure and appended claims, are obtained by the method and compositions of the present invention which, briefly stated, comprise preparing an emulsion from components comprising an hydroxyl-endblocked organopolysiloxane and an aminoxy group-containing organosilicon compound in the presence of a surfactant and water. The resulting emulsion can agitated and/or allowed to stand at room and/or higher temperatures until the desired degree of polymerization has occurred.

DETAILED DESCRIPTION OF THE INVENTION

The present invention relates to a method for the preparation of an organopolysiloxane emulsion said method comprising emulsion-polymerizing components comprising (A) an organopolysiloxane having the general formula $HO(R_2SiO)_mH$ wherein R is a monovalent organic group and m is an integer having a value of ten or more and (B) an aminoxy group-containing organosilicon compound having the general formula $R^1R^2NO(R^3_2SiO)_nR^3_2SiONR^1R^2$ wherein $R^1$, $R^2$, and $R^3$ are monovalent hydrocarbon groups and n is zero or an integer having a value of one or more, in the presence of (C) a surfactant and (D) water.

To explain the preceding, the organopolysiloxane comprising component (A) is a starting material for the emulsion of the present invention, and has the general formula $HO(R_2SiO)_mH$.

R in the above formula is any monovalent organic group, as exemplified by alkyl groups such as methyl ethyl, propyl and butyl; substituted alkyl groups such as 2-phenylethyl, 2-phenylpropyl and 3,3,3-trifluoropropyl; alkenyl groups such as vinyl and propenyl aryl and substituted aryl groups such as phenyl and tolyl: as well as gamma-aminopropyl, gamma-(N-ethylamino)propyl, gamma-(N-butylamino)propyl, 4-(N-cyclohexylamino)butyl, 4-(N-phenylamino)butyl, N-aminoethylaminopropyl, beta-(N,N-dimethylamino)ethyl, gamma-mercaptopropyl, 3,4-epoxycyclohexylpropyl, gamma-mercaptopropyl, and gamma-methacryloxypropyl. The R groups in the organopolysiloxane may be entirely identical or may be different.

The average value of m is to be ten or more. When m is smaller than ten, one finds that the viscosity of the organopolysiloxane extracted after emulsion preparation will be subject to large fluctuations. While an upper limit on m is not specified, m is preferably selected from within a range which permits the mechanical emulsification of the instant component. It is preferred that m be 50 or greater, and even more preferably 100 to 3,000.

The aminoxy group-containing organosilicon compound comprising component (B) has the general formula $R^1R^2NO(R^3{}_2SiO)_nR^3{}_2SiONR^1R^2$. This component participates in a chain-elongation reaction with the organopolysiloxane comprising component (A).

The groups $R^1$, $R^2$, and $R^3$ in the above formula are to be monovalent hydrocarbon groups, and are exemplified by alkyl groups such as methyl, ethyl, propyl, and butyl; substituted alkyl groups such as 2-phenylethyl 2-phenylpropyl, and 3,3,3-trifluoropropyl: alkenyl groups such as vinyl and propenyl; and aryl and substituted aryl groups such as phenyl and tolyl. The groups $R^1R^2$, and $R^3$ in component (B) may be entirely identical or may be different.

The average value of n is to be zero or 1 or more. While an upper limit on n is not specified, n is preferably selected from within a range which permits the mechanical emulsification of this component. A value of zero or 1 to 2,000 is even more preferred.

Component (B) is to be used at preferably 0.1 to 100 weight parts and more preferably 0.2 to 50 weight parts per 100 weight parts component (A).

The surfactant comprising component (C) is the essential component for emulsifying components (A) and (B), and encompasses the nonionic, anionic, and cationic surfactants.

The nonionic surfactants are concretely exemplified by the polyoxyalkylene alkyl ethers, the polyoxyalkylene alkylphenol ethers, the polyoxyalkylene alkyl esters the polyoxyalkylene sorbitan alkyl esters, the polyethylene glycols, the polypropylene glycols, and diethylene glycol.

The anionic surfactants are concretely exemplified by alkylbenzenesulfonic acids, for example, hexylbenzenesulfonic acid, octylbenzenesulfonic acid, decylbenzenesulfonic acid, dodecylbenzenesulfonic acid, cetylbenzenesulfonic acid, and myristylbenzenesulfonic acid; the sulfate esters of polyoxyethylene monoalkyl ethers, for example, $CH_3(CH_2)_6CH_2O(C_2H_4O)_2SO_3H$ $CH_3(CH_2)_8CH_2O(C_2H_4O)_8SO_3H$ $CH_3(CH_2)_{19}CH_2O(C_2H_4O)_4SO_3H$ $CH_3(CH_2)_8CH_2C_6H_4O(C_2H_4)_2SO_3H$;

and alkylnaphthylsulfonic acids.

The cationic surfactants are concretely exemplified by quaternary ammonium hydroxides and their salts, for example. octyltrimethylammonium hydroxide, dodecyltrimethylammonium hydroxide, hexadecyltrimethylammonium hydroxide, octyldimethylbenzylammonium hydroxide, decyldimethylbenzylammonium hydroxide, didodecyldimethylammonium hydroxide, dioctadecyldimethylammonium hydroxide, tallow trimethylammonium hydroxide, and cocotrimethylammonium hydroxide.

When a nonionic surfactant is used in the organopolysiloxane emulsion of the present invention, one will not encounter any impairment of the stability even with the addition of anionic or cationic additives and it becomes possible to add anionic surfactants or cationic surfactants.

Considered from the standpoint of emulsification efficiency. nonionic surfactant, the combination of nonionic and anionic surfactants, and the combination of nonionic and cationic surfactants are preferred.

This surfactant component is to be used preferably at 1 to 50 weight parts, more preferably at 2 to 40 weight parts and more preferably at 3 to 20 weight parts per 100 weight parts of the total quantity of components (A) plus (B).

Water, component (D). is the dispersing medium in which components (A) and (B) are emulsified and dispersed in the presence of component (C). While its quantity of use is unrestricted, in general water will be used in a quantity which affords an organopolysiloxane concentration of 10 to 50 wt % and more preferably 10 to 50 wt %.

Components (A) and (B) undergo a chain-elongation polymerization reaction in the emulsion of the present invention to afford high-viscosity organopolysiloxane or organopolysiloxane gum. After preparation of the emulsion of the present invention it may be allowed to stand or may be stirred for 30 minutes to 12 hours at 5 to 70 degrees Centigrade to generate an emulsion of high-viscosity organopolysiloxane. The method of the present invention does not specifically require heating, but the polymerization time can be shortened by heating.

The emulsion compositions of this invention can be prepared in any manner that will lead to a chain-elongation emulsion polymerization reaction between components (A) and (B).

For example, to prepare the emulsion of the present invention, components (A) and (B) are first mixed to uniformity, and the surfactant comprising component (C) and a small amount of water are then added. After mixing to homogeneity, emulsification is carried out using an emulsifying device such as a colloid mill, line mill, or homomixer, and finally, additional water is added to obtain a uniform dilution. Additional water may be added with emulsification and dispersion to homogeneity.

As an alternative, an emulsion is prepared by emulsifying component (A) using part of component (C) and part of component (D), and another emulsion is similarly prepared by emulsifying component (B) using the remaining component (C) and the remaining component (D). These are mixed to afford the emulsion of the present invention.

Other means for emulsion-polymerizing components (A) and (B) in the presence of a surfactant and water will become apparent to the reader and are within the scope and spirit of this invention.

As necessary, the emulsions obtained as above may be stabilized by using an emulsifying device such as an homogenizer.

The organopolysiloxane emulsion of the present invention may, as desired, contain the following additives, preferably added when (A) and (B) are emulsified. Organodialkoxysilanes and organotrialkoxysilanes having monovalent organic groups as specified for the groups R above, and their partial hydrolysis condensates; the salts of organic carboxylic acids with metals such as iron, lead, antimony, cadmium, titanium, calcium, bismuth, zirconium, etc.; organic amine condensation catalysts such as triethanolamine, triethylenediamine, and dimethylphenylamine, etc.; antiseptics; colorants; resin finishing agents such as glyoxal resins, melamine resins, urea resins, polyester resins, and acrylic resins; rubber latexes such as styrene-butadiene latexes and natural rubber latexes; organohydrogenpolysiloxane emulsions and organoalkoxysilane emulsions, among others.

The organopolysiloxane emulsions of the present invention can be used, for example as fiber-treatment agents, lubricants, release agents, glass fiber- treatment agents, lustrants, defoamers, and paint components.

In their application as fiber-treatment agents, the organopolysiloxane emulsions of the present invention can be applied to the fibrous material by various methods, for example, spray application, roll application, coating with a brush, impregnation, etc. While the quantity of application cannot be specifically restricted because it will depend on the fibrous material under consideration, in general it will fall into the range of 0.01 to 10.0 wt % as organopolysiloxane based on the fibrous material. The fibrous material is then processed by, for example, standing at ambient temperature, exposure to hot air, or heating.

With regard to their substance, such fibrous materials encompass natural fibers such as wool, silk, linen, cotton, angora, mohair, and asbestos; regenerated fibers such as rayon and bemberg; semisynthetic fibers such as acetate; synthetic fibers such as polyester, polyamide, polyacrylonitrile, polyvinyl chloride, vinylon, polyethylene, polypropylene, and spandex; and inorganic fibers such as glass fiber, carbon fiber, and silicon carbide fiber. They may be in the state of the staple, filament, tow, top, or yarn, and may take the form of knits, weaves, and nonwovens.

The present invention will be explained in the following with reference to illustrative examples. Unless specified otherwise, in the examples parts=weight parts, %=weight %. and the viscosity was measured at 25 degrees Centigrade.

EXAMPLE 1

Hydroxyl-terminated dimethylpolysiloxane, 380 parts, having a viscosity of 2,500 centistokes, 20 parts aminoxy- containing dimethylpolysiloxane with the formula $(C_2H_5)_2NO\{(CH_3)_2SiO\}(CH_3)_2SiON (C_2H_5)_2$, 20 parts polyoxyethylene (6EO) trimethylnonyl ether, 10 parts polyoxyethylene (45EO) nonylphenyl ether, and 40 parts water were stirred for 10 minutes in a 1,000 mL beaker. This was then emulsified in a colloid mill, and finally 570 parts water was added with emulsification and dispersion to homogeneity. This emulsion was allowed to stand at the ambient temperature for 12 hours and was then divided into portions.

Isopropanol was added to a portion to destroy the emulsion. The viscosity of the extracted oil was 1,200,000 centistokes. The isopropanol-soluble material was then analyzed by gas chromatography. The quantity of oligomer was 0.5% based on the weight of the total organopolysiloxane in the emulsion.

Another portion of the emulsion was allowed to stand at the ambient temperature for 3months: oil separation did not occur, indicating that the emulsion was stable.

Tests of the stability of the emulsion after the addition of anionic or cationic surfactant are described in the following, and these results are reported in Table 1.

Emulsion Stability After the Addition of Anionic Surfactant

Water, 400 parts, was added to 10 parts of the instant emulsion to afford an organopolysiloxane concentration of approximately 1%. Two parts of the sulfate ester of stearyl alcohol was added. followed by dissolution and dispersion to uniformity. A 200 g portion was placed in a 225 cc glass bottle with cap, and this was then maintained in a thermostatted bath at 60 degrees Centigrade for 24 hours.

Emulsion Stability After the Addition of Cationic Surfactant

Water, 400 parts, was added to 10 parts of the instant emulsion to afford an organopolysiloxane concentration of approximately 1%. Two parts quaternary ammonium salt with the formula $(C_{18}H_{37})_2N^+(CH_3)_2 CH_3SO_4^-$ was added, followed by dissolution and dispersion to uniformity. A 200 g portion of the emulsion was placed in a 225 cc glass bottle with cap, and this was then maintained in a thermostatted bath at 60 degrees Centigrade for 24 hours.

TABLE 1

| | Stability in the presence of | |
| --- | --- | --- |
| | Anionic Surfactant | Cationic Surfactant |
| Example 1 | + + | + + |
| Example 2 | + + | + + |
| Example 3 | + + | + + |
| Comparison Example 1 | + + | x |
| Comparison Example 2 | x | + + |

+ + = uniform. without separation.
+ = oil floating on part of the surface.
x = emulsion destroyed. separation into 2 layers.

COMPARISON EXAMPLE 1

Cyclic dimethylpolysiloxane tetramer 40 parts, 2 parts dodecylbenzenesulfonic acid, and 58 parts water were thoroughly stirred, and the mixture was passed three times through an homogenizer at a pressure of 400 kg/cm$^2$. Polymerization was then conducted at 85 degrees Centigrade for 2 hours and at 20 degrees Centigrade for 5 hours. The pH was adjusted to 7.0 using sodium carbonate to afford an anionic emulsion-polymerized dimethylpolysiloxane emulsion.

Isopropanol, 20 g, was added to a 10 g portion of this emulsion to break the emulsion. The isopropanol-soluble material was then analyzed by gas chromatography. The quantity of oligomer was 13.2% based on the weight of the total organopolysiloxane in the emulsion. The viscosity of the extracted organopolysiloxane was 75,000 centistokes.

The stability of the emulsion after the addition of anionic or cationic surfactant was tested as described in Example 1, and these results are reported in Table 1.

COMPARISON EXAMPLE 2

Cyclic dimethylpolysiloxane tetramer, 40 parts, 0.5 parts N-aminoethylaminopropyltrimethoxysilane, 5 parts tallow trimethylammonium chloride cationic surfactant, and 54.5 parts water were stirred to homogeneity, and this was then passed through an homogenizer three times at a pressure of 450 kg/cm$^2$. Potassium hydroxide, 0.5 parts, was then added, and the mixture was stirred at 85 degrees Centigrade for 5 hours. The pH was adjusted to 7.0 by the addition of acetic acid to afford a cationic emulsion-polymerized emulsion. The extracted organopolysiloxane was a gum.

The stability after the addition of cationic or anionic surfactant was tested as described in Example 1, and these results are reported in Table 1.

EXAMPLE 2

Hydroxyl-terminated dimethylpolysiloxane, 370 parts, having a viscosity of 15,000 centistokes, 20 parts aminoxy- containing dimethylpolysiloxane having the formula $(C_2H_5)_2NO\{(CH_3)_2SiO\}_6(CH_3)_2SiON(C_2H_5)_2$, and 10 parts of the partial hydrolyzate of methyltrimethoxysilane were stirred in a 1,500 mL beaker. To this were added 20 parts polyoxyethylene (5EO) tridecyl ether, 10 parts polyoxyethylene (45EO) nonylphenyl ether, and 40 parts water, followed by stirring for 10 minutes. This was then emulsified in a colloid mill. Water, 560 parts, was then added with emulsification and dispersion to uniformity.

This emulsion was allowed to stand at the ambient temperature for 12 hours to carry out emulsion polymerization. Isopropanol, 20 g, was added to a 10 g portion of this emulsion to break the emulsion. The isopropanol-soluble material was then analyzed by gas chromatography. The quantity of oligomer was only 0.2% based on the weight of the total organopolysiloxane in the emulsion. The extracted organopolysiloxane was a rubbery elastic polymer.

After this emulsion had been allowed to stand at the ambient temperature for 24 hours, it was divided into portions. The emulsion was destroyed by the addition of isopropanol to one portion, and the organopolysiloxane was extracted. One obtains a polymer exhibiting rubbery elasticity.

After standing at the ambient temperature for 3 months, this emulsion evidenced no signs of separation, and could therefore be adjudged as stable.

The stability after the addition of anionic or cationic surfactant was tested as described in Example 1, and these results are reported in Table 1.

EXAMPLE 3

Hydroxyl-terminated dimethylpolysiloxane, 200 parts, having a viscosity of 2 500 centistokes, 200 parts aminoxy- containing dimethylpolysiloxane with the formula $(C_2H_5)_2NO\{(CH_3)_2SiO\}_{400}(CH_3)_2SiON(C_2H_5)_2$ and having a viscosity of 1,500 centistokes, 30 parts polyoxyethylene (5EO) tridecyl ether, 10 parts polyoxyethylene (45EO) nonylphenyl ether, and 50 parts water were stirred for 10 minutes in a 1,000 mL beaker. After emulsification using a colloid mill, 510 parts water was then added with emulsification and dispersion to uniformity.

This emulsion was divided into portions after standing at the ambient temperature for 12 hours. Isopropanol was added to one portion to destroy the emulsion. Extraction of the organopolysiloxane afforded a gummy polymer. The isopropanol-soluble material was then analyzed by gas chromatography. The quantity of oligomer was only 0.2% based on the weight of the total organopolysiloxane in the emulsion.

After standing at the ambient temperature for 3 months, the instant emulsion had not separated could be adjudged stable.

The stability of the emulsion the addition of anionic or cationic surfactant was tested a in Example 1, and these results are reported in Table 1.

EXPERIMENTAL EXAMPLE 1

Three treatment baths were follows:

Water, 400 parts, was added parts of the emulsion obtained as described in Example 1 afford an organopolysiloxane concentration of approximately 1%.

Anionic surfactant was added described in Example 1, followed by standing for 24 hours.

Cationic surfactant was added described in Example 1, followed by standing for 24 hours.

Into each bath was immersed (10 seconds) a 20 cm×20 cm sample of a finished Tetoron yarn (dyed beige). After expression on a mangle to an ratio of 100%, the fabric was dried at 105 degrees 5 minutes, and was then heated at 130 degrees Centigrade for 5 minutes. After treatment, each fabric was evaluated for its and the presence or absence of oil spots.

The emulsions prepared in - son Examples 1 and 2 were similarly examined, and the reported in Table 2.

TABLE 2

| | | Treated Fabric | |
|---|---|---|---|
| | Treatment Bath | Handle of | Oil Spots on |
| Example 1 | only dilution with water | good | none |
| | addition of anionic surfactant | good | none |
| | addition of cationic surfactant | very good | none |
| Comparison Example 1 | only dilution with water | good | none |
| | addition of anionic surfactant | fair | none |
| | addition of cationic surfactant | poor | numerous small oil spots (fatal defect) |
| Comparison Example 2 | only dilution with water | good | none |
| | addition of anionic surfactant | poor | numerous small oil spots (fatal defect) |
| | addition of cationic surfactant | very good | none |

EXAMPLE 4

Hydroxyl-terminated dimethylpolysiloxane, 380 parts, having a viscosity of 2,500 centistokes, 20 parts aminoxy- containing dimethylpolysiloxane with the formula $(C_2H_5)_2NO\{(CH_3)_2SiO\}_6(CH_3)_2SiON(C_2H_5)_2$, 20 parts polyoxyethylene (6EO) trimethylnonyl ether, 10 parts polyoxyethylene (45EO) nonylphenyl ether, and 40 parts water were stirred for 10 minutes in a 1,000 mL beaker. This was then emulsified in a colloid mill, and finally,570 parts water was added with emulsification and dispersion to homogeneity.

An emulsion was obtained by allowing this to stand at 60 degrees Centigrade for 7 hours in order to carry out emulsion polymerization. Isopropanol, 20 g, was added to a 10 g portion of this emulsion to break the emulsion. The isopropanol-soluble material was then analyzed by gas chromatography. The quantity of oligomer was 0.5% based on the weight of the total organopolysiloxane in the emulsion. Furthermore, the viscosity of the extracted organopolysiloxane was 1,320,000 centistokes.

This emulsion was allowed to stand at the ambient temperature for 3 months, oil separation did not occur, indicating that the emulsion was stable.

COMPARISON EXAMPLE 3

Cyclic dimethylpolysiloxane tetramer, 40 parts 2 parts dodecylbenzenesulfonic acid, and 58 parts water were thoroughly stirred, and the mixture was passed three times through an homogenizer at a pressure of 400 kg/cm$^2$. Polymerization was then conducted at 85 degrees Centigrade for 2 hours and at 20 degrees Centigrade for 48 hours. The pH was adjusted to 7.0 using sodium carbonate to afford an anionically emulsion-polymerized dimethylpolysiloxane emulsion.

Isopropanol, 20 g, was added to a 10 g portion of this emulsion to break the emulsion. The isopropanol-soluble material was then analyzed by gas chromatography. The quantity of oligomer was 13.1% based on the weight of the total organopolysiloxane in the emulsion. The viscosity of the extracted organopolysiloxane was 1,192,000 centistokes.

COMPARISON EXAMPLE 4

Cyclic dimethylpolysiloxane tetramer, 40 parts. 2 parts dodecylbenzenesulfonic acid, and 58 parts water were thoroughly stirred, and the mixture was passed three times through an homogenizer at a pressure of 400 kg/cm$^2$. Polymerization was then conducted at 25 degrees Centigrade for 5 hours.

The pH was adjusted to 7.0 using sodium carbonate to afford an anionically emulsion-polymerized dimethylpolysiloxane emulsion.

Isopropanol, 20 g, was added to a 10 g portion of this emulsion to break the emulsion. The viscosity of the extracted organopolysiloxane was 5.06 centistokes.

COMPARISON EXAMPLE 5

Cyclic dimethylpolysiloxane tetramer, 40 parts, 5 parts tallow trimethylammonium chloride cationic surfactant, and 55 parts water were stirred to homogeneity, and this was then passed through an homogenizer three times at a pressure of 450 kg/cm$^2$. Potassium hydroxide. 0.5 parts, was then added and the mixture was stirred at 85 degrees Centigrade for 5 hours. The pH was adjusted to 7.0 by the addition of acetic acid to afford a cationically emulsion-polymerized emulsion.

Isopropanol, 20 g, was added to a 10 g portion of this emulsion to break the emulsion. The isopropanol-soluble material was then analyzed by gas chromatography. The quantity of oligomer was 15.5% based on the weight of the total organopolysiloxane in the emulsion. The viscosity of the extracted organopolysiloxane was 1,400 centistokes.

COMPARISON EXAMPLE 6

Cyclic dimethylpolysiloxane tetramer, 40 parts, 5 parts tallow trimethylammonium chloride cationic surfactant, and 55 parts water were stirred to homogeneity, and this was then passed through an homogenizer three times at a pressure of 450 kg/cm$^2$. Potassium hydroxide, 0.5 parts, was then added, and the mixture was stirred at 85 degrees Centigrade for 48 hours. The pH was adjusted to 7.0 by the addition of acetic acid to afford a cationically emulsion-polymerized emulsion.

Isopropanol, 20 g, was added to a 10 g portion of this emulsion to break the emulsion. The isopropanol-soluble material was then analyzed by gas chromatography. The quantity of oligomer was 15.4% based on the weight of the total organopolysiloxane in the emulsion. The viscosity of the extracted organopolysiloxane was 52,800 centistokes.

COMPARISON EXAMPLE 7

Cyclic dimethylpolysiloxane tetramer, 40 parts, 5 parts tallow trimethylammonium chloride cationic surfactant, and 55 parts water were stirred to homogeneity, and this was then passed through an homogenizer three times at a pressure of 450 kg/cm$^2$. Potassium hydroxide. 0.5 parts, was then added, and the mixture was stirred at 25 degrees Centigrade for 24 hours. The pH was adjusted to 7.0 by the addition of acetic acid to afford a cationically emulsion-polymerized emulsion.

Isopropanol, 20 g, was added to a 10 g portion of this emulsion to break the emulsion. The viscosity of the extracted organopolysiloxane was 21.6 centistokes.

EXAMPLE 5

Hydroxyl-terminated dimethylpolysiloxane, 380 parts, having a viscosity of 15,000 centistokes and 20 parts aminoxy-containing dimethylpolysiloxane having the formula $(C_2H_5)_2NO\{(CH_3)_2SiO\}_6(CH_3)_2SiON(C_2H_5)_2$ were stirred in a 1,500 mL beaker. To this were added 20 parts polyoxyethylene (5EO) tridecyl ether, 10 parts polyoxyethylene (45EO) nonylphenyl ether, and 40 parts water, followed by stirring for 10 minutes. This was then emulsified in a colloid mill. Water, 560 parts, was then added with emulsification and dispersion to uniformity. An emulsion was obtained by allowing this to stand at the ambient temperature for 12 hours to carry out emulsion polymerization.

Isopropanol, 20 g, was added to a 10 g portion of this emulsion to break the emulsion. The isopropanol-soluble material was then analyzed by gas chromatography. The quantity of oligomer was only 0.2% based on the weight of the total organopolysiloxane in the emulsion. The viscosity of the extracted organopolysiloxane was 1,700,000 centistokes.

This emulsion was allowed to stand at the ambient temperature for 3 months: separation did not occur, indicating that the emulsion was stable.

EXAMPLE 6

Amino group-containing dimethylpolysiloxane, 380 parts, having a viscosity of 1,200 centistokes and having the formula

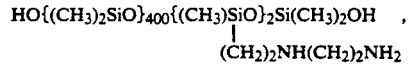

20 parts aminoxy-containing dimethylpolysiloxane having a viscosity of 40 centistokes and having the formula $(C_2H_5)_2NO\{(CH_3)_2SiO\}_6(C_3)_2SiON(C_2H_5)_2$, 40 parts polyoxyethylene (6EO) trimethylnonanol ether, and 50 parts water were stirred in a 1,000 mL beaker for 10 minutes. This was then emulsified in a colloid mill. Water, 488 parts, was then added with emulsification and dispersion to uniformity. An emulsion was obtained by allowing this to stand at the ambient temperature for 12 hours to carry out emulsion polymerization.

Isopropanol, 20 g, was added to a 10 g portion of this emulsion to break the emulsion. The isopropanol-soluble material was then analyzed by gas chromatography. The quantity of oligomer was only 0.2% based on the weight of the total organopolysiloxane in the emulsion. The extracted organopolysiloxane was a polymer gum.

EFFECTS OF THE INVENTION

Because the organopolysiloxane emulsion of the present invention is prepared from an hydroxyl-terminated organopolysiloxane, an aminoxy group-containing organosilicon compound, a nonionic surfactant, and water, it is characterized by the absence of any impairment in stability upon the addition of an anionic or cationic additive.

Because the present invention s method for the preparation of an organopolysiloxane emulsion consists of the emulsion polymerization in water in the presence of surfactant of an hydroxyl-terminated organopolysiloxane and an aminoxy group-containing organosilicon compound, it is characterized by the absence of a heating requirement, particularly during emulsion polymerization, by the appearance of little organopolysiloxane oligomer after emulsion polymerization, and by the ability to prepare diorganopolysiloxane up to the level of gums, which was not previously possible.

Furthermore, because the organopolysiloxane emulsion of the present invention is an emulsion of organopolysiloxane having a higher viscosity than the viscosity of the organopolysiloxane prior to emulsification, one characteristically can prepare emulsions of organopolysiloxane having viscosities which previously were not susceptible to mechanical emulsification.

Furthermore, because emulsion polymerization in the present invention's method for preparation is carried out by standing at the ambient temperature after emulsification, it is characteristic of the invention's method of preparation that packaging can be carried out immediately after emulsification, which results in an extremely high productivity.

What is claimed is:

1. A method for the preparation of an organopolysiloxane emulsion, said method comprising preparing an emulsion of components comprising
   (A) an organopolysiloxane having the general formula $HO(R_2SiO)_mH$ wherein R is a monovalent organic group selected from the group consisting of alkyl groups, 2-phenylethyl, 2-phenylpropyl, 3,3,3-trifluoropropyl, alkenyl groups, phenyl, tolyl, and gamma-aminopropyl, gamma-(N-ethylamino)propyl, gamma-(N-butylamino)propyl, 4-(N-cyclohexylamino)butyl, 4-(N-phenylamino)butyl, N-aminoethylaminopropyl, beta-(N,N-dimethylamino)ethyl, gamma-glycidoxypropyl, 3,4-epoxycyclohexylpropyl, gamma-mercaptopropyl, and gamma-methacryloxypropyl, and m has an average value of ten or more and
   (B) 0.1 to 100 weight parts, per 100 weight parts component (A), of an aminoxy group-containing organosilicon compound having the general formula $R^1R^2NO(R^3{}_2SiO)_nR^3{}_2SiONR^1R^2$ wherein $R^1$, $R^2$, and $R^3$ are monovalent hydrocarbon groups selected from the group consisting of alkyl groups, 2-phenylethyl, 2-phenylpropyl, 3,3,3-trifluoropropyl, alkenyl groups, phenyl and tolyl and n is zero or more; in the presence of
   (C) 1 to 50 weight parts, per 100 weight parts of the total quantity of components (A) plus (B) of a surfactant and
   (D) an emulsion-forming amount of water; and stirring the emulsion or allowing the emulsion to stand for 30 minutes to 12 hours at 5 to 70 degrees Centigrade.

2. A method according to claim 1 wherein component (C) is a nonionic surfactant.

3. A method according to claim 1 wherein the amount of component (B) that is used is from 0.1 to 100 weight parts per 100 weight parts component (A), the amount of component (C) that is used is 1 to 50 weight parts, per 100 weight parts of the total quantity of components (A) plus (B) and the amount of component (D) that is used is a quantity which affords an organopolysiloxane concentration of from 10 to 50 percent by weight, based on the weight of the emulsion.

4. A method according to claim 3 wherein component (A) is an hydroxyl-endblocked polydimethylsiloxane, component (B) is an aminoxy-containing polydimethylsiloxane wherein n has a value of 1 or more and component (C) is a nonionic surfactant.

5. A method according to claim 4 wherein components (A) and (B) are first mixed: component (C) and a small amount of component (D) are then admixed to the mixture of components (A) and (B); emulsification of the resulting mixture of components (A), (B), (C) and (D) is carried out using an emulsifying device to provide an emulsion; and the remaining portion of component (D) is added to the resulting emulsion.

6. A method according to claim 4 wherein component (A), part of component (C) and part of component (D) are used to prepare a first emulsion; component (B). the remaining part of component (C) and the remaining part of component (D) are used to prepare a second emulsion; and said first and second emulsions are mixed.

7. A method for the preparation of an organopolysiloxane emulsion, said method comprising preparing an emulsion of components comprising
   (A) an organopolysiloxane having the general formula $HO(R_2SiO)_mH$ wherein R is a monovalent organic group selected from the group consisting of alkyl groups, 2-phenylethyl, 2-phenylpropyl, 3,3,3-trifluoropropyl, alkenyl groups, phenyl, tolyl, gamma-aminopropyl, gamma-(N-ethylamino)propyl, gamma-(N-butylamino)propyl, 4-(N-cyclohexylamino)butyl, 4-(N-phenylamino)butyl, N-aminoethylaminopropyl, beta-(N,N-dimethylamino)ethyl, gamma-glycidoxypropyl, 3,4-epoxycyclohexylpropyl, gamma-mercaptopropyl, and gamma-methacryloxypropyl, and m has an average value of ten or more,
   (B) 0.1 to 100 weight parts, per 100 weight parts component (A), of an aminoxy group-containing organosilicon compound having the general formula $R^1R^2NO(R^3{}_2SiO)_nR^3{}_2SiONR^1R^2$ wherein $R^1$, $R^2$, and $R^3$ are monovalent hydrocarbon groups selected from the group consisting of alkyl groups, 2-phenylethyl, 2-phenylpropyl, 3,3,3-trifluoropropyl, alkenyl groups, phenyl and tolyl, and n is zero or more;
   (C) 1 to 50 weight parts, per 100 weight parts of the total quantity of components (A) plugs (B) of a surfactant and
   (D) an emulsion-forming amount of water.

8. A method according to claim 7 wherein component (C) is a nonionic surfactant.

9. A method according to claim 7 wherein the amount of component (B) that is used is from 0.1 to 100 weight parts per 100 weight parts component (A), the amount of component (C) that is used is 1 to 50 weight parts, per 100 weight parts of the total quantity of components (A) plus (B) and the amount of component (D) that is used is a quantity which affords an organopolysiloxane concentration of from 10 to 50 percent by weight, based on the weight of the emulsion.

10. A method according to claim 9 wherein component (A) is an hydroxyl-endblocked polydimethylsiloxane, component (B) is an aminoxy-containing polydimethylsiloxane wherein n has a value of 1 or more and component (C) is a nonionic surfactant.

11. An organopolysiloxane emulsion prepared by the method of claim 1.

12. An organopolysiloxane emulsion prepared by the method of claim 2.

13. An organopolysiloxane emulsion prepared by the method of claim 3.

14. An organopolysiloxane emulsion prepared by the method of claim 4.

15. An organopolysiloxane emulsion prepared by the method of claim 5.

16. An organopolysiloxane emulsion prepared by the method of claim 6.

17. An organopolysiloxane emulsion prepared by the method of claim 7.

18. An organopolysiloxane emulsion prepared by the method of claim 8.

19. An organopolysiloxane emulsion prepared by the method of claim 9.

20. An organopolysiloxane emulsion prepared by the method of claim 10.

* * * * *